US012679661B2

(12) United States Patent
Park et al.

(10) Patent No.: US 12,679,661 B2
(45) Date of Patent: Jul. 14, 2026

(54) APPARATUS AND METHOD FOR CHECKING POINT OF IMPACT

(71) Applicant: SEMES CO., LTD.,
Chungcheongnam-do (KR)

(72) Inventors: Sang Hoon Park, Seoul (KR); Kang Kwon, Incheon (KR)

(73) Assignee: SEMES CO., LTD.,
Chungcheongnam-do (KR)

( * ) Notice: Subject to any disclaimer, the term of this patent is extended or adjusted under 35 U.S.C. 154(b) by 1028 days.

(21) Appl. No.: 17/740,354

(22) Filed: May 10, 2022

(65) Prior Publication Data

US 2022/0380132 A1 Dec. 1, 2022

(30) Foreign Application Priority Data

May 28, 2021 (KR) ........................ 10-2021-0069293

(51) Int. Cl.
*G06F 7/00* (2006.01)
*B65G 43/00* (2006.01)
*G05B 15/02* (2006.01)
(52) U.S. Cl.
CPC .............. *B65G 43/00* (2013.01); *G05B 15/02* (2013.01)
(58) Field of Classification Search
CPC ........ B65G 43/08; B65G 47/22; B65G 47/14; B65G 43/02–10; B65G 43/00–08; B65G 47/02; B65G 47/04; B65G 2801/61; G05B 15/02; G05B 15/00; G05B 13/00; B65H 23/192; B65H 2801/61; B65H 23/00;

(Continued)

(56) References Cited

U.S. PATENT DOCUMENTS 4,151,594 A * 4/1979 Stern .................... B65H 19/181
242/554.6
2018/0079615 A1* 3/2018 Shigehara .......... B65H 23/1888

FOREIGN PATENT DOCUMENTS

CN 102673946 9/2012
CN 102673946 A * 9/2012 ............. B65G 17/02

(Continued)

OTHER PUBLICATIONS

Office Action (1st) dated Mar. 21, 2025 for Chinese Patent Application No. 202210498647.6 and its English translation from Global Dossier.
Office Action dated May 18, 2023 for Korean Patent Application No. 10-2021-0069293 and its English translation provided by Global Dossier.

*Primary Examiner* — Yolanda R Cumbess
(74) *Attorney, Agent, or Firm* — WOMBLE BOND DICKINSON (US) LLP

(57) ABSTRACT

Provided is an apparatus for checking a point of impact. The apparatus for checking a point of impact includes: a first supply unit configured to supply an object through rolling; a second supply unit configured to receive the object from the first supply unit through rolling and supply the object to a demand place; a variable unit configured to apply a tension force by pressurizing the object or release the tension force by releasing the pressurization based on a change in a position; a detection unit configured to detect the change in the position of the variable unit to generate position information of the object; a guide unit provided between the first supply unit and the second supply unit to guide the object; and a control unit configured to control a handling process including the supply of the object based on the position information of the detection unit.

6 Claims, 10 Drawing Sheets

(58) Field of Classification Search

CPC ........ B65H 26/00; B65H 35/00; B65H 37/00; B65H 43/00; B65H 51/00; B65H 54/00; B65H 57/00; B65H 59/00; B65H 2801/00; B65H 2601/00; B65H 2557/00; B65H 2553/00; B65H 2515/00; B65H 2513/00; B65H 2404/00; B65H 2407/00; B65H 2301/00; B65H 2402/00; B65H 79/00; B65H 63/00; B65H 75/00; B65H 23/025; B65H 23/044; B65H 23/048; B65H 23/063; B65H 23/08; B65H 23/085; B65H 23/16; B65H 23/18; B65H 23/188–1884; B65H 23/1888; B65H 23/195; B65H 23/1955; B65H 23/198; B65H 26/02; B65H 26/04; B41J 2/01; B41J 3/407; B41J 2/0456; B41J 3/46; B41J 2/00; B41J 3/00; H10K 71/00; H10K 71/13; G01N 15/0205; G01N 2015/003; G01N 15/00

USPC .................. 700/213, 304, 301, 1, 28, 32, 34

See application file for complete search history.

(56)        References Cited

FOREIGN PATENT DOCUMENTS

| | | | | |
|---|---|---|---|---|
| CN | 106865308 | 6/2017 | | |
| CN | 107031202 | 8/2017 | | |
| CN | 112185832 | 1/2021 | | |
| EP | 2623440 A1 * | 8/2013 | ............. | B65G 15/30 |
| EP | 3564042 A2 * | 11/2019 | ......... | B41M 7/0045 |
| JP | 2013-71323 | 4/2013 | | |
| KR | 10-0952035 | 4/2010 | | |
| KR | 10-2014-0058451 | 5/2014 | | |
| KR | 20140058451 A1 * | 5/2014 | ............. | B65H 35/00 |
| KR | 10-2014-0069395 | 6/2014 | | |
| KR | 20140069395 A1 * | 6/2014 | | |
| KR | 10-2016-0013709 | 2/2016 | | |
| KR | 10-2018-0088716 | 8/2018 | | |
| KR | 10-2021-0003358 | 1/2021 | | |
| KR | 10-2021-0018647 | 2/2021 | | |
| KR | 20210018647 A * | 2/2021 | ....... | H01L 21/67253 |
| WO | WO-2018236389 A1 * | 12/2018 | ............. | B65H 20/34 |

* cited by examiner

[FIG. 1]
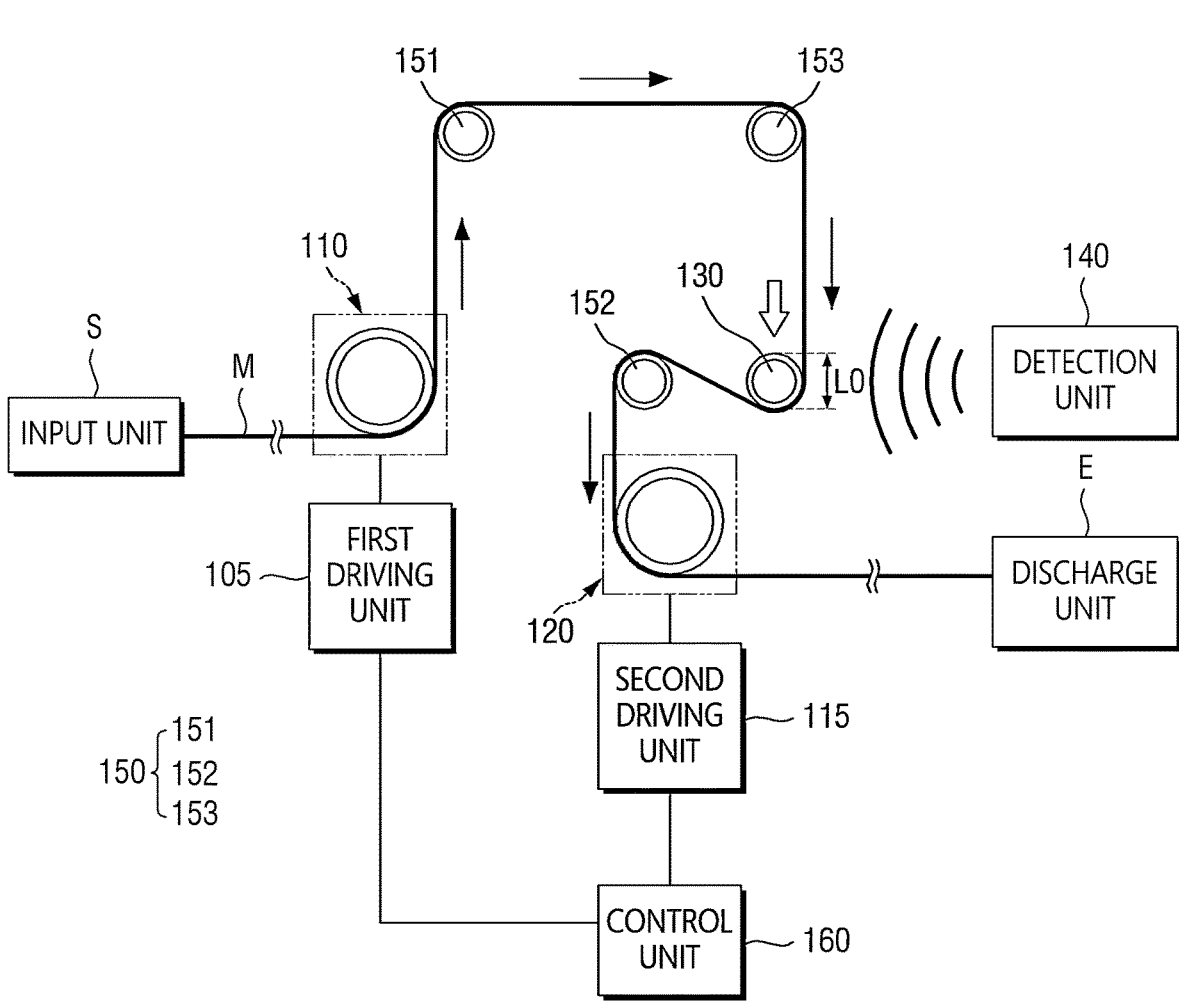

[FIG. 2]
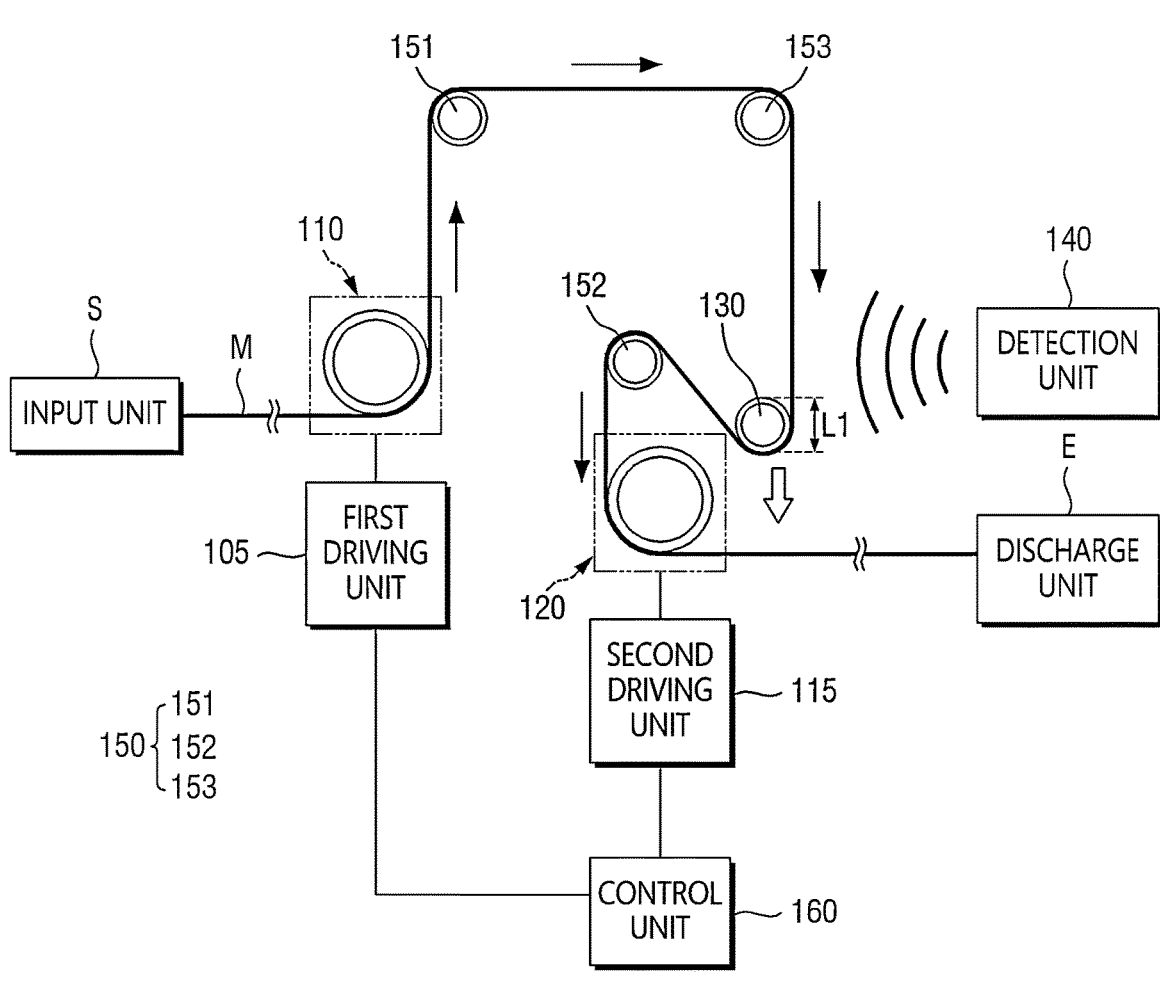

[FIG. 3]
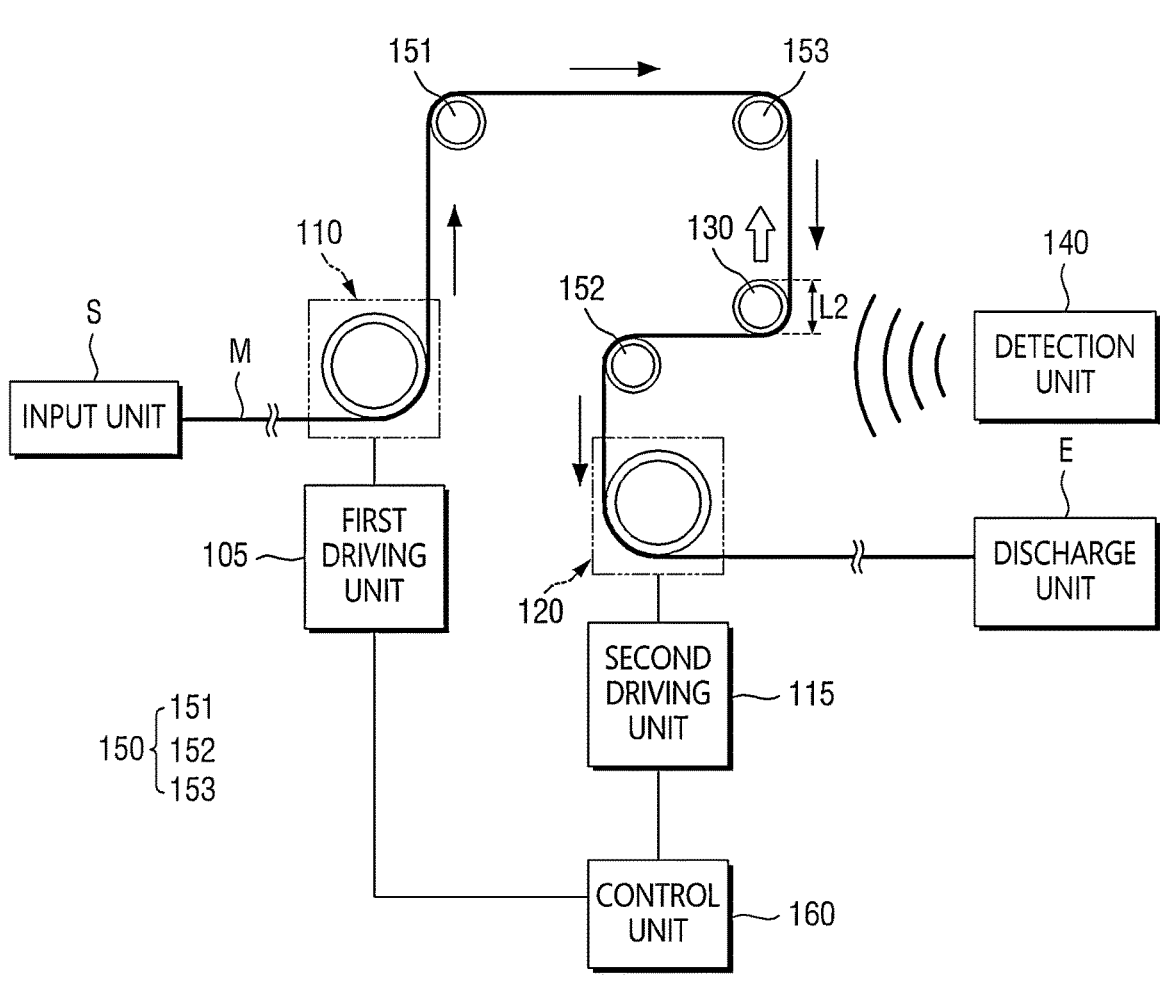

[FIG. 4]
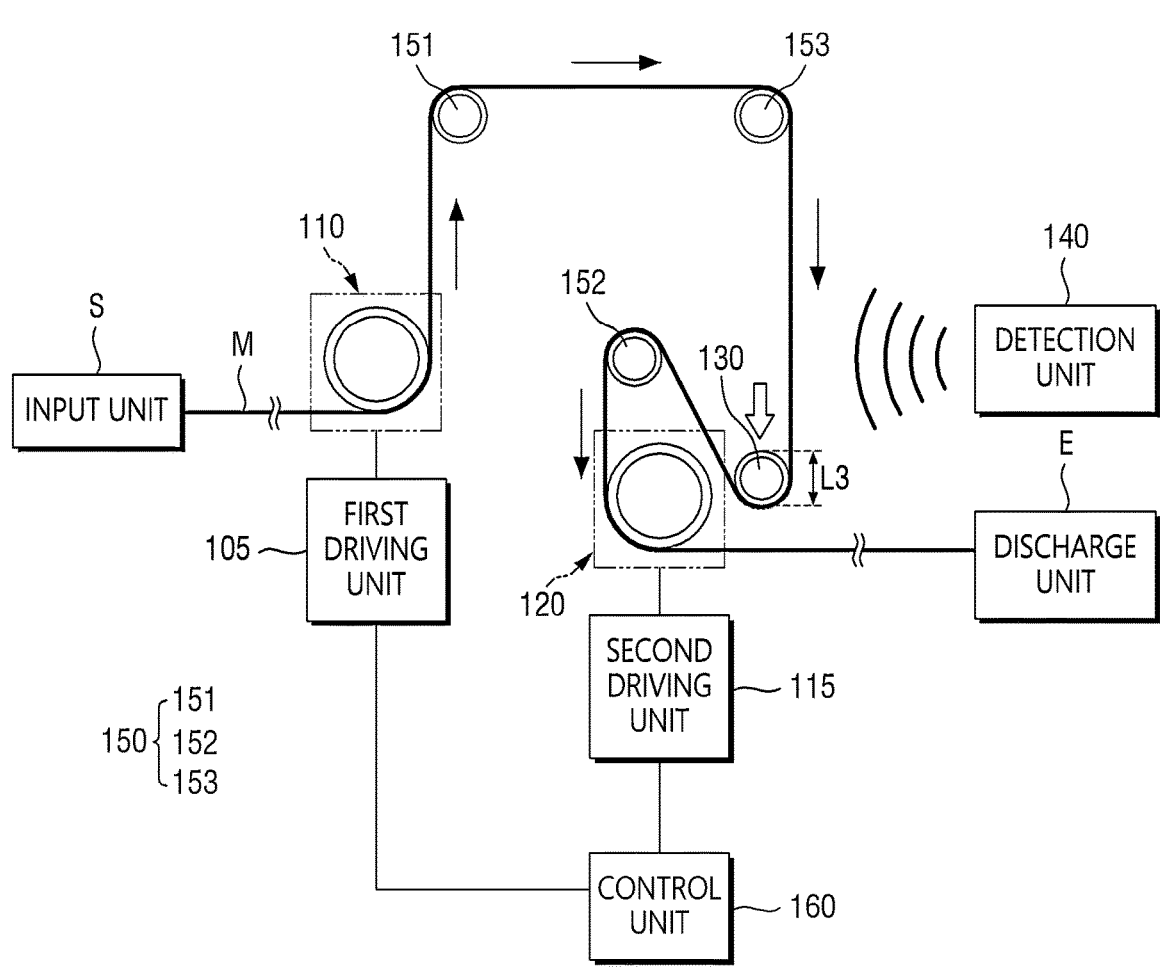

[FIG. 5]
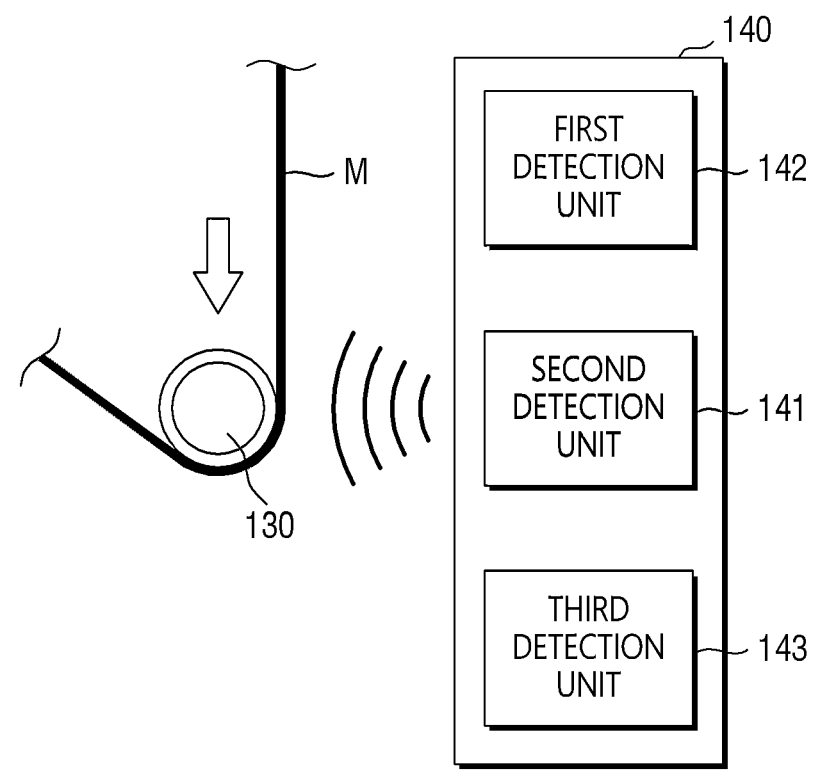

[FIG. 6]
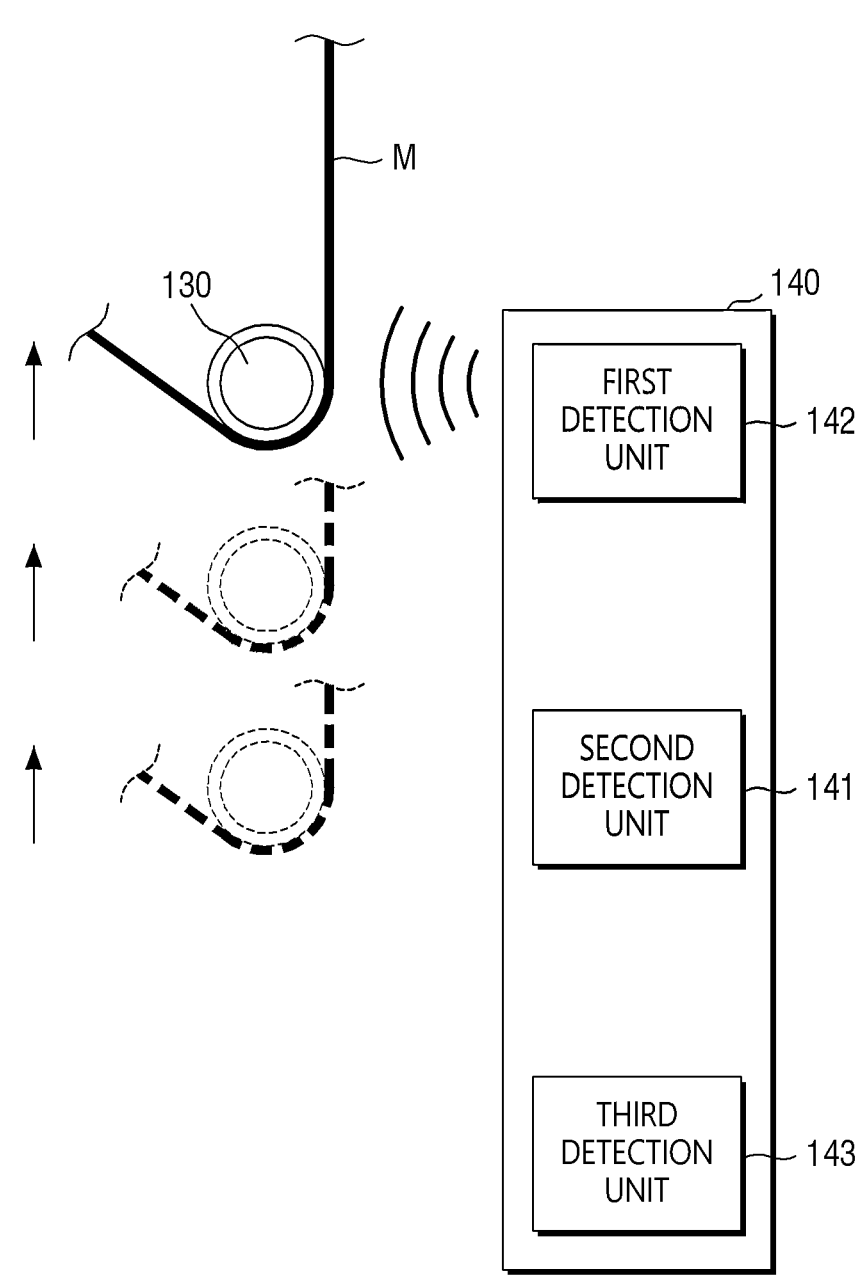

[FIG. 7]
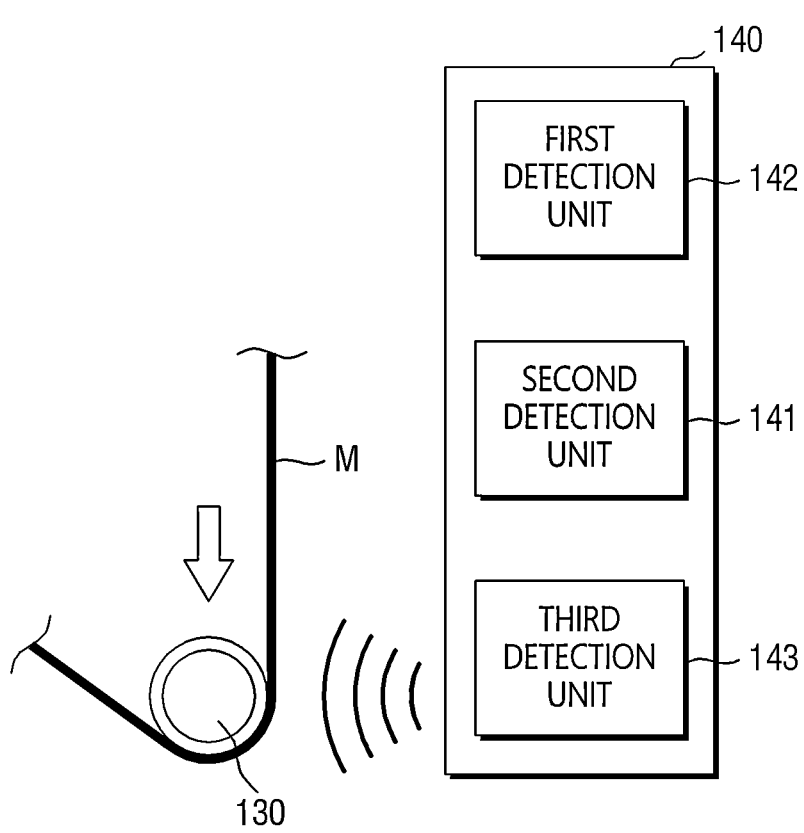

[FIG. 8]
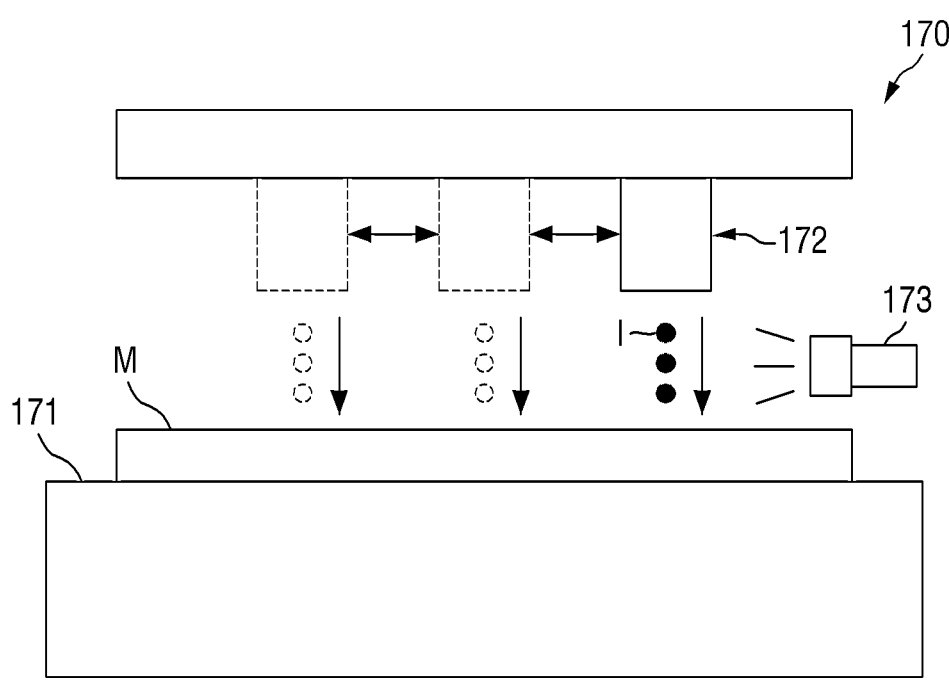

[FIG. 9]
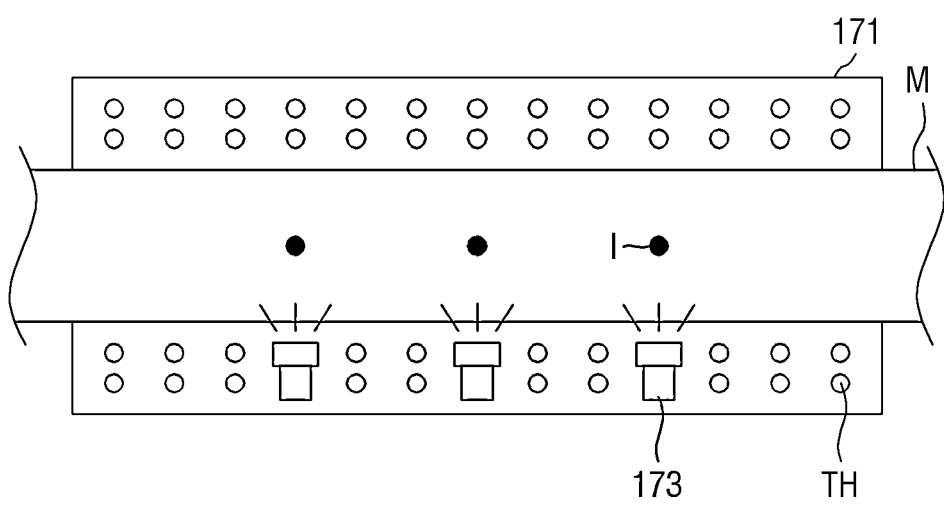

[FIG. 10]
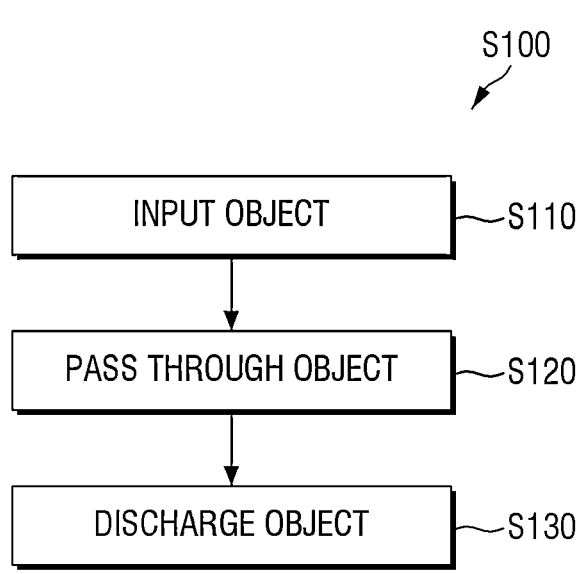

APPARATUS AND METHOD FOR CHECKING POINT OF IMPACT

CROSS-REFERENCE TO RELATED APPLICATION

This application claims priority from Korean Patent Application No. 10-2021-0069293 filed on May 28, 2021 in the Korean Intellectual Property Office, and all the benefits accruing therefrom under 35 U.S.C. 119, the contents of which in their entirety are herein incorporated by reference.

BACKGROUND

1. Field of the Disclosure

The present disclosure relates to an apparatus and method for checking a point of impact.

2. Description of the Related Art

In a process of manufacturing a display device (e.g., related to OLED), there is a need for a process of uniformly and precisely printing an object portion. In addition, it is necessary to supply an object in a stable and optimized state in advance for such printing. In other words, it is necessary to provide the object in a matching state on a printing portion in order to accurately measure a point of impact by accurate printing. In a conventional case, a technology of a method of supplying an object based on an encoder in a process of supplying the object has been developed. However, this method has a problem in that it is not easy to prevent the object from being separated, prevent a slip phenomenon, check an equipment state, and accurately control the amount of movement of the object.

RELATED ART DOCUMENT

[Patent Document]
(Patent Document 1) Korean Patent No. 10-0952035

SUMMARY

The present disclosure is directed to providing an apparatus and method for checking a point of impact, which provide environments capable of accurately checking whether liquid is impacted under suitable conditions (e.g., discharge speed, discharge uniformity, and volume of the liquid) as a part of a process of manufacturing a display device.

In addition, the present disclosure is directed to providing an apparatus and method for checking a point of impact, which may control the supply of an object (e.g., film) on which liquid is discharged stably and effectively as a part of a process of manufacturing a display device so that the object is prepared in a state optimized for impacting the liquid.

In addition, the present disclosure is directed to providing an apparatus and method for checking a point of impact, which may prevent an object from being separated, prevent a slip phenomenon, check an equipment state, and accurately control the amount of movement of the object according to the adoption of an encoder method as a part of a process of manufacturing a display device.

The objects of the present disclosure are not limited to the aforementioned objects, and other objects not mentioned will be clearly understood by those skilled in the art from the following description.

An apparatus for checking a point of impact according to an aspect of the present disclosure includes: a first supply unit configured to supply an object through rolling; a second supply unit configured to receive the object from the first supply unit through rolling and supply the object to a demand place; a variable unit configured to apply a tension force by pressurizing the object or release the tension force by releasing the pressurization based on a change in a position; a detection unit configured to detect the change in the position of the variable unit to generate position information of the object; a guide unit provided between the first supply unit and the second supply unit to guide the object; and a control unit configured to control a handling process of the object based on the position information of the detection unit.

In addition, the position of the variable unit may be changed into a first variable state of being moved to a first position that is a lower position from a reference position, a second variable state of being moved to a second position that is an upper position from the reference position, and a third variable state of being moved to a third position that is a position lower than the first position, and the detection unit may include a first detection unit configured to detect the first variable state of the variable unit to generate first position information, a second detection unit configured to detect the second variable state of the variable unit to generate second position information, and a third detection unit configured to detect the third variable state of the variable unit to generate third position information.

In addition, the control unit may interrupt the handling process of the object when the third position information is generated.

In addition, the control unit may interrupt the handling process by acquiring first speed information in which the variable unit is switched from the first variable state or the second variable state to the third variable state based on the first position information to the third position information, interrupt the handling process with a first delay value when the first speed information does not meet a preset first reference, and interrupt the handling process with a second delay value greater than the first delay value when the first speed information meets the first reference.

In addition, the control unit may be operated so that supply speeds of the objects on the first supply unit and the second supply unit are adjusted based on the switch of the variable unit from the first variable state to the second variable state.

In addition, the control unit may adjust a supply speed of the object by acquiring second speed information in which the variable unit is switched from the first variable state to the second variable state based on the first position information and the second position information, and supply the supply speed of the object as a first speed value when the second speed information does not meet a preset second reference, and supply the supply speed of the object as a second speed value greater than the first speed value when the second speed information meets the second reference.

In addition, the guide unit may include a first guide unit having a bar shape positioned on the first supply unit and configured to guide the supply of the object, a second guide unit having a bar shape positioned on the second supply unit and configured to guide the supply of the object, and a third guide unit having a bar shape positioned between the first guide unit and the second guide unit and configured to guide the supply of the object, and the variable unit may be positioned adjacent to the second guide unit and positioned above the object guided by the second guide unit to apply or release the tension force.

In addition, the demand place may be provided with an impact portion configured to impact a liquid on the object, the impact portion may include a mounting panel on which the object is seated, a spray unit configured to spray and impact the liquid on the seated object, and a capturing unit configured to capture the liquid, and the capturing unit may measure the size and uniformity of the liquid impacted on the seated object.

A method of checking a point of impact according to another aspect of the present disclosure includes: inputting an object; passing the input object through a first supply unit and a second supply unit; and discharging the object passed through the first supply unit and the second supply unit to a demand place, wherein the object may be guided by a guide unit and tensed or relaxed based on a change in a position of a variable unit, and a control unit may control a process of the object based on position information when a detection unit detects the change in the position of the variable unit to generate the position information.

The apparatus and method for checking the point of impact according to the present disclosure have one or more of the following effects.

The present disclosure can provide an apparatus and method for checking a point of impact, which may provide environments capable of accurately checking whether a liquid is impacted under suitable conditions (e.g., discharge speed, discharge uniformity, and volume of the liquid) as a part of a process of manufacturing a display device.

In addition, the present disclosure can provide an apparatus and method for checking a point of impact, which may control the supply of an object (e.g., film) on which the liquid is discharged stably and effectively as a part of a process of manufacturing a display device so that the object is prepared in the state optimized for impacting the liquid.

In addition, the present disclosure can provide an apparatus and method for checking a point of impact, which may prevent an object from being separated, prevent a slip phenomenon, check an equipment state, and accurately control the amount of movement of the object according to the adoption of an encoder method as a part of a process of manufacturing a display device.

It should be noted that objects of the present disclosure are not limited to the above-described objects, and other objects of the present disclosure will be apparent to those skilled in the art from the following descriptions.

BRIEF DESCRIPTION OF THE DRAWINGS

The above and other aspects and features of the present disclosure will become more apparent by describing in detail exemplary embodiments thereof with reference to the attached drawings, in which:

FIG. 1 is a diagram showing a configuration of an apparatus for checking a point of impact according to one exemplary embodiment of the present disclosure;

FIGS. 2 to 4 are diagrams showing operating states of the apparatus for checking the point of impact of FIG. 1;

FIGS. 5 to 7 are diagrams showing states where some components of the apparatus for checking the point of impact of FIG. 1 are detected depending on a change in positions;

FIGS. 8 and 9 are diagrams schematically showing the configuration of the apparatus for checking the point of impact of FIG. 1; and FIG. 10 is a flowchart sequentially showing a method of checking a point of impact according to one exemplary embodiment of the present disclosure.

DETAILED DESCRIPTION OF THE EMBODIMENTS

Hereinafter, preferred exemplary embodiments of the present disclosure will be described in detail with reference to the accompanying drawings. Advantages and features of the present disclosure, and a method of achieving them will become apparent with reference to the exemplary embodiments described below in detail in conjunction with the accompanying drawings. However, the present disclosure is not limited to the exemplary embodiments described below but may be implemented in various different forms, and only these exemplary embodiments are provided to allow the disclosure of the present disclosure to be complete, and fully inform those skilled in the art to which the present disclosure pertains of the scope of the disclosure, and the present disclosure is only defined by the scope of the claims. The same reference numerals refer to the same components throughout the specification.

Spatially relative terms "below", "beneath", "lower", "above", "upper", etc. may be used to easily describe the correlation between an element or components and other elements or components as shown in the drawings. The spatially relative terms should be understood as terms including different directions of the element while using or operating in addition to the directions shown in the drawings. For example, when the element shown in the drawing is turned over, the element described as "below" or "beneath" another element may be placed "above" another element. Therefore, the exemplary term "below or beneath" may include both directions below and above. The element may also be oriented in other directions, and therefore, the spatially relative terms may be interpreted depending on the orientations.

It is natural that although first, second, etc. are used to describe various elements, components, and/or sections, these elements, components, and/or sections are not limited by these terms. These terms are only used to distinguish one element, component, or section from another element, component, or section. Therefore, it is natural that the first element, the first component, or the first section mentioned below may also be the second element, the second component, or the second section within the technical spirit of the present disclosure.

The terminology used in this specification is for the purpose of describing the exemplary embodiments and is not intended to limit the present disclosure. In this specification, the singular form also includes the plural form unless otherwise specified in the phrase. "Comprises" and/or "comprising" used in the specification do not preclude the presence or addition of one or more other components, steps, operations, and/or elements other than the stated component, step, operation, and/or element.

Unless otherwise defined, all terms (including technical and scientific terms) used in this specification may be used as the meaning commonly understood by those skilled in the art to which the present disclosure pertains. In addition, terms defined in a commonly used dictionary are not to be interpreted ideally or excessively unless clearly specifically defined.

Hereinafter, exemplary embodiments of the present disclosure will be described in detail with reference to the accompanying drawings, and in describing the present disclosure with reference to the accompanying drawings, the same reference numerals are given to the same or corresponding components regardless of the reference numerals and overlapped descriptions thereof will be omitted.

Referring to FIG. 1, an apparatus for checking a point of impact according to one exemplary embodiment of the present disclosure includes an input unit S, a first driving unit 105, a first supply unit 110, a second driving unit 115, a second supply unit 120, a variable unit 130, a detection unit 140, a guide unit 150, and a control unit 160.

Here, the detection unit 140 includes a first detection unit 141, a second detection unit 142, and a third detection unit 143. The guide unit 150 includes a first guide unit 151, a second guide unit 152, and a third guide unit 153.

An object M is input into the input unit S. The first supply unit 110 allows the object M to be transferred to a post-process through rolling. The input unit S is supplied so that the object M may be unwound in the form of a roll.

Conversely, the input unit S simply becomes a part through which the object passes in the form of the roll, and a part actually installed to allow the object to be unwound may also become the first supply unit 110.

The second supply unit 120 receives the object M from the first supply unit 110 through rolling. The second supply unit 120 supplies the object M to a demand place. The first driving unit 105 and the second driving unit 115 provide a driving force to the first supply unit 110 and the second supply unit 120 to enable the rolling.

Meanwhile, the demand place includes a destination for performing processing on the object. In addition, a discharge unit E corresponds to a position discharging the object M or a region serving to discharge the object M so that the object M is supplied to the demand place. The second supply unit 120 is provided on the same line as the first supply unit 110, or is provided at a different position with a different height.

Referring to FIGS. 1 to 4, the variable unit 130 pressurizes the object M based on a change in the position. A tension force is applied to the object M through the pressurization, or the tension force is released by releasing the pressurization.

The variable unit 130 at least controls a speed at which the object M is transferred by applying the tension force or releasing the tension force in a process in which the object M passes through the first supply unit 110 and the second supply unit 120.

Referring to FIGS. 5 to 7, the detection unit 140 detects the change in the position of the variable unit 130. The detection unit 140 generates position information corresponding to the change in the position of the object M. At this time, the variable unit 130 is changed into a first variable state to a third variable state.

The first variable state is a state where the variable unit 130 is moved from a predetermined reference position L0 to a first position L1 that is a lower position. The second variable state is a state where the variable unit 130 is moved from the reference position L0 to a second position L2 that is an upper position. The third variable state is a state where the variable unit 130 is moved to a third position L3 that is a position lower than the first position L1.

The first detection unit 141 of the detection unit 140 detects the first variable state of the variable unit 130 to generate first position information. The second detection unit 142 of the detection unit 140 detects the second variable state of the variable unit 130 to generate second position information. The third detection unit 143 of the detection unit 140 detects the third variable state of the variable unit 130 to generate third position information.

In addition, the control unit 160 controls a handling process including the transfer of the object throughout the process. The control unit 160 interrupts the handling process of the object M when the third position information is generated.

More specifically, the control unit 160 interrupts the handling process by acquiring first speed information associated with the variable unit 130 in which the variable unit 130 is switched from the first variable state or the second variable state to the third variable state based on the first position information to the third position information.

In addition, the handling process is interrupted with a first delay value when the first speed information does not meet a preset reference value, and the handling process is interrupted with a second delay value greater than the first delay value when the first speed information meets the preset reference value.

Here, the first delay value and the second delay value include times to interrupt the handling process. Therefore, the second delay value corresponds to a value for interrupting the handling process with a delay greater than the first delay value Conventionally, the control unit 160 interrupts the handling process at a preset speed when the variable unit 130 is switched to the third variable state from the first or second variable state. However, the faster the speed at which the variable unit 130 is switched to the third variable state from the first or second variable state, the greater the pressurizing force that is applied to the object M.

In consideration of this greater pressurizing force being applied to the object M when the control unit 160 interrupts the handling process at the preset speed, the control unit 160 interrupts the handling process using the second delay value having a greater degree of delay than the first delay value when the first speed information meets the preset reference value (e.g., the preset speed).

Therefore, the transfer of the object M may be suddenly interrupted using the second delay value in a situation where the variable unit 130 is changed into the third position L3 or lower, that is, the variable unit 130 is moved downward, thereby preventing the object M from being damaged or separated due to friction, the tension force, etc. as a result of a greater pressurizing force being applied to the object M.

The control unit 160 is operated so that supply speeds of the objects M on the first supply unit 110 and the second supply unit 120 are adjusted based on the switch of the variable unit 130 from the first variable state to the second variable state.

Here, the control unit 160 adjusts the supply speed of the object M by acquiring second speed information that is a speed at which the variable unit 130 is switched from the first variable state to the second variable state based on the first position information and the second position information.

For example, the control unit 160 uses the first speed value, that is a preset normal random speed, as the supply speed for the object M when the second speed information does not meet a second preset reference value.

In addition, the control unit 160 uses a second speed value greater than the first speed value as the supply speed for the object M when the second speed information meets the second preset reference value. Here, the second speed value corresponds to a speed faster than a speed of the first speed value.

The first guide unit 151 of the guide unit 150 as a bar-shaped body is positioned on the first supply unit 110 side and guides the supply of the object M. The second guide unit 152 as a bar-shaped body is positioned on the second supply unit 120 side and guides the supply of the object M.

The third guide unit 153 as a bar-shaped body is positioned between the first guide unit 151 and the second guide unit 152 and guides the supply of the object M.

Meanwhile, the variable unit 130 is positioned adjacent to the second guide unit 152 and positioned above the object M guided by the second guide unit 152 to apply or release the tension force according to the pressurization. The variable unit 130 has, for example, a weight form applying a load and includes various types of structures that enable vertical movement.

Referring to FIGS. 8 and 9, an impact portion 170 configured to impact a liquid I on the object M is provided on the demand place. The impact portion 170 includes a mounting panel 171, a spray unit 172, and a capturing unit 173.

The object M is seated on the mounting panel 171 of the impact portion 170. The mounting panel 171 is formed with a plurality of perforations TH for adsorption to the object M. The spray unit 172 sprays and impacts the liquid I on the seated object M.

The capturing unit 173 captures the spray unit 172 and the liquid I. The capturing unit 173 measures the size and uniformity of the liquid I impacted on the seated object M. In addition, it is also possible to measure the state by capturing the liquid I in a discharge process.

Referring to FIG. 10, a method of checking a point of impact (S100) according to one exemplary embodiment of the present disclosure first inputs the object M to be supplied to the demand place in S110. In S120, the object M passes through the first supply unit 110 and the second supply unit 120. In S130, the object M having passed through the first supply unit 110 and the second supply unit 120 is discharged to the demanding place.

Here, the object M is guided by the guide unit 150 and tensed or relaxed based on the change in the position of the variable unit 130. The detection unit 140 detects the change in the position of the variable unit 130 to generate the position information. The control unit 160 controls the process of the object M based on the position information.

Although the exemplary embodiments of the present disclosure have been described with reference to the above description and the accompanying drawings, those skilled in the art to which the present disclosure pertains will understand that the present disclosure may be carried out in other specific forms without changing the technical spirit or essential features thereof. Therefore, it should be understood that the aforementioned exemplary embodiments are illustrative in all respects and are not restrictive.

What is claimed is:

1. An apparatus for checking a point of impact, the apparatus comprising:

a first supply unit configured to supply an object through rolling;

a second supply unit configured to receive the object from the first supply unit through rolling and supply the object to a demand place;

a variable unit configured to apply a tension force by pressurizing the object or to release the tension force by releasing the pressurization based on a change in positions within the apparatus at which the variable unit is disposed, the variable unit being movable between variable states that correspond to different ones of the positions, the variable states comprise a first variable state, a second variable state, and a third variable state, and the variable unit being a sole unit of the apparatus that is movable between different ones of the positions;

a detection unit configured to detect the change in the position of the variable unit to generate position information of the object;

a guide unit provided between the first supply unit and the second supply unit to guide the object; and a control unit configured to control a handling process of the object based on the position information of the detection unit, wherein the control unit is configured to control a supply speed of the object based on a vertical movement speed of the variable unit, wherein a reference position is set for the variable unit, the first variable state of the variable unit is at a first position lower than the reference position, the second variable state of variable unit is at a second position higher than the reference position, and the third variable state of the variable unit is at a third position lower than the first position, wherein the detection unit includes a first detection unit configured to detect the first variable state of the variable unit and to generate first position information when the variable unit is detected at the first variable state, a second detection unit configured to detect the second variable state of the variable unit and to generate second position information when the variable unit is detected at the second variable state, and a third detection unit configured to detect the third variable state of the variable unit and to generate third position information when the variable unit is detected at the third variable state, wherein the control unit interrupts the handling process of the object when the third position information is generated by the third detection unit, wherein the control unit further interrupts the handling process based on the vertical movement speed of the variable unit as the variable unit moves itself between the variable states, the variable unit being moved between the variable states being detected using the first position information, the second position information, and the third position information, wherein the control unit is operated so that supply speeds of the objects on the first supply unit and the second supply unit are adjusted based on the variable unit being moved between the first variable state to the second variable state, and wherein the control unit is further configured to:

interrupt the handling process by a first delay when the vertical movement speed of the variable unit, as the variable unit moves itself from the reference position to a position lower than the reference position, meets a first preset speed, interrupt the handling process by a second delay longer than the first delay when the vertical movement speed of the variable unit, as the variable unit moves itself from the reference position to the position lower than the reference position, does not meet the first preset speed, control the handling process at a first supply speed when the vertical movement speed of the variable unit, as the variable unit moves itself from a position higher than the reference position to the reference position, does not meet a second preset speed, and control the handling process at a second supply speed faster than the first supply speed when the vertical movement speed of the variable unit, as the variable unit moves itself from the position higher than the reference to the reference position, meets the second preset speed.

2. The apparatus of claim 1, wherein
the guide unit includes a first guide unit having a bar shape positioned on the first supply unit and configured to guide the supply of the object, a second guide unit having a bar shape positioned on the second supply unit and configured to guide the supply of the object, and a third guide unit having a bar shape positioned between the first guide unit and the second guide unit and configured to guide the supply of the object, and
the variable unit is positioned adjacent to the second guide unit and positioned above the object guided by the second guide unit to apply or release the tension force.

3. The apparatus of claim 1, wherein
the demand place is provided with an impact portion configured to impact a liquid on the object,
the impact portion includes a mounting panel on which the object is seated, a spray unit configured to spray and impact the liquid on the seated object, and a capturing unit configured to capture the liquid, and
the capturing unit measures the size and uniformity of the liquid impacted on the seated object.

4. A method of checking a point of impact, the method comprising:
inputting an object;
passing the input object through a first supply unit and a second supply unit; and
discharging the object passed through the first supply unit and the second supply unit to a demand place,
wherein the object is guided by a guide unit and tensed or relaxed using a variable unit based on a change in positions within an apparatus in which the variable unit is disposed, the variable unit being movable between variable states that correspond to different ones of the positions, the variable states comprise a first variable state, a second variable state, and a third variable state, and the variable unit being a sole unit of the apparatus that is movable between different ones of the positions,
wherein a control unit controls a handling process of the object based on position information when a detection unit detects the change in the position of the variable unit to generate the position information,
wherein the control unit controls a supply speed of the object based on a vertical movement speed of the variable unit,
wherein a reference position is set for the variable unit, the first variable state of the variable unit is at a first position lower than the reference position, the second variable state of variable unit is at a second position higher than the reference position, and the third variable state of the variable unit is at a third position lower than the first position,
wherein the detection unit includes a first detection unit configured to detect the first variable state of the variable unit and to generate first position information when the variable unit is detected at the first variable state, a second detection unit configured to detect the second variable state of the variable unit and to generate second position information when the variable unit is detected at the second variable state, and a third detection unit configured to detect the third variable state of the variable unit and to generate third position information when the variable unit is detected at the third variable state,
wherein the control unit interrupts the handling process of the object when the third position information is generated by the third detection unit,
wherein the control unit further interrupts the handling process based on the vertical movement speed of the variable unit as the variable unit moves itself between the variable states, the variable unit being moved between the variable states being detected using the first position information, the second position information, and the third position information,
wherein the control unit is operated so that supply speeds of the objects on the first supply unit and the second supply unit are adjusted based on the variable unit being moved between the first variable state to the second variable state, and
wherein the control unit is further configured to:
interrupt the handling process by a first delay when the vertical movement speed of the variable unit, as the variable unit moves itself from the reference position to a position lower than the reference position, meets a first preset speed,
interrupt the handling process by a second delay longer than the first delay when the vertical movement speed of the variable unit, as the variable unit moves itself from the reference position to the position lower than the reference position, does not meet the first preset speed,
control the handling process at a first supply speed when the vertical movement speed of the variable unit, as the variable unit moves itself from a position higher than the reference position to the reference position, does not meet a second preset speed, and
control the handling process at a second supply speed faster than the first supply speed when the vertical movement speed of the variable unit, as the variable unit moves itself from the position higher than the reference to the reference position, meets the second preset speed.

5. The method of claim 4, wherein
the guide unit includes a first guide unit having a bar shape positioned on the first supply unit and configured to guide the supply of the object, a second guide unit having a bar shape positioned on the second supply unit and configured to guide the supply of the object, and a third guide unit having a bar shape positioned between the first guide unit and the second guide unit and configured to guide the supply of the object, and
the variable unit is positioned adjacent to the second guide unit and positioned above the object guided by the second guide unit to apply or release a tension force.

6. The method of claim 4, wherein
the demand place is provided with an impact portion configured to impact a liquid on the object,
the impact portion includes a mounting panel on which the object is seated, a spray unit configured to spray and impact the liquid on the seated object, and a capturing unit configured to capture the liquid, and
the capturing unit measures the size and uniformity of the liquid impacted on the seated object.

* * * * *